E. LANGGUTH.
PROCESS OF TREATING ORES.
APPLICATION FILED FEB. 10, 1912.
1,078,360.
Patented Nov. 11, 1913.
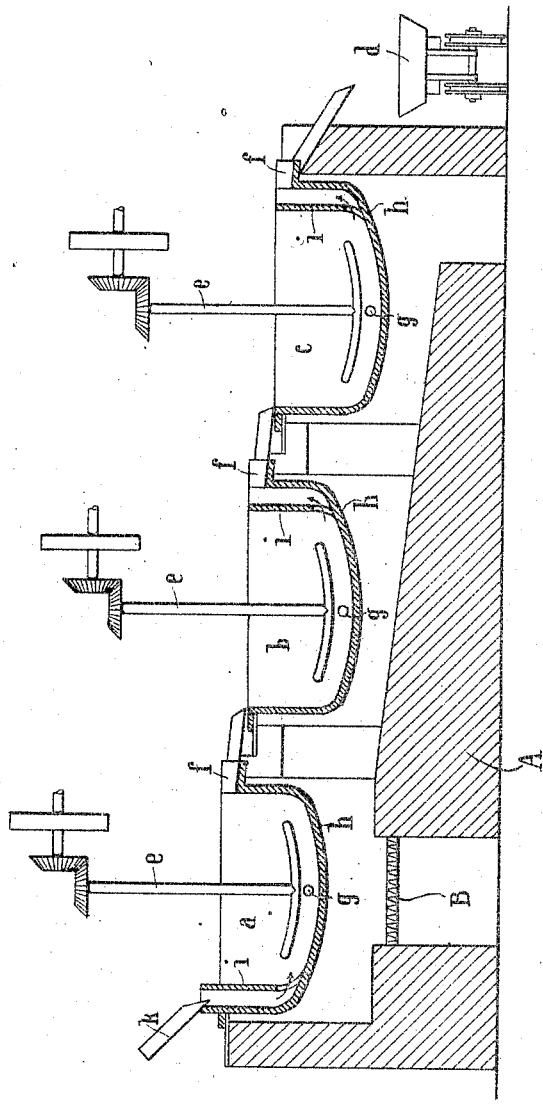
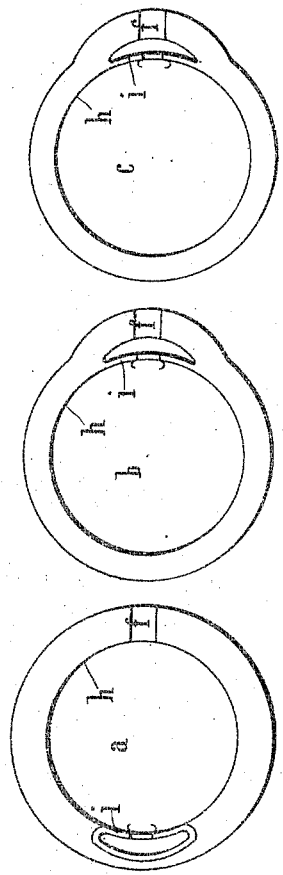
WITNESSES:
G. V. Rasmussen
J. A. Ferguson
INVENTOR
ERICH LANGGUTH
BY
ATTORNEYS

UNITED STATES PATENT OFFICE.

ERICH LANGGUTH, OF NEERPELT, BELGIUM.

PROCESS OF TREATING ORES.

1,078,360.  Specification of Letters Patent.  Patented Nov. 11, 1913.

Application filed February 10, 1912. Serial No. 676,869.

*To all whom it may concern:*

Be it known that I, ERICH LANGGUTH, a subject of the King of Prussia, and a resident of Neerpelt, in the Province of Limbourg, Belgium, have invented a new, useful, and Improved Process of Treating Ores, of which the following, taken in connection with the accompanying drawings, is a specification.

My invention relates to the treatment of ores containing lead, silver and zinc, ores containing lead and silver and ores containing silver. Heretofore the process of treating such ores by decomposing them by means of chlorid of zinc, or a mixture of zinc chlorid and alkali chlorid, and reducing the resulting lead chlorid and silver chlorid by means of zinc, has been carried out in a single vat or boiler. The whole of the lead obtained as a result of this process had then to be subjected to a desilverizing process, since the silver was naturally distributed throughout the whole mass of the lead.

My invention is by way of an improvement and development of the above process and divides the above process into a number of phases or steps. I am thus enabled to obtain the silver and the lead separately and to carry on the treatment as a continuous process instead of a periodic or intermittent one and to secure a complete separation of the metal from the molten mass with which the metal is mixed.

One form of the apparatus of my invention by the use of which my improved process may be practised is shown in the accompanying drawings in which—

Figure 1 is a longitudinal section of the apparatus and Fig. 2 is a plan view of the series of decomposing vessels, the supports therefor and other parts being omitted.

The apparatus comprises a plurality of decomposing vessels, pots or vats. In the form of apparatus illustrated, the vats are three in number and are indicated by the reference characters $a$, $b$, and $c$. The pots are arranged in tiers, as clearly shown, and are supported suitably in a furnace A provided with a grate B below the vat $a$. Each vat is provided with a stirrer or agitator $e$, driven in any suitable manner, as by the shafting and gearing shown. Each vat is furthermore provided with an overflow duct $f$, and a discharge aperture $g$ normally closed by a removable closure plug. Through the apertures $g$ the reduced metal may be withdrawn. Through the ducts $f$ the supernatant molten mass may overflow into the next lower vat and finally into the transportable vessel $d$, by means of which the mass is carried to the dissolving device (not shown). The chlorid with which the ore is treated may be introduced into the vat $a$ through the conduit $k$.

In practising the process of my invention it has been found particularly useful and beneficial to employ vats, each having a dividing diaphragm, reaching almost to the bottom of the vat and dividing the latter into two parts, a main compartment and a secondary compartment. Through the secondary compartment of the vat $a$, the molten mass is supplied to said vat, while through the secondary compartments of vats $b$ and $c$, the mass is withdrawn from said vats. The inner wall of the secondary compartment has the same convexity or curvature as the wall of the adjacent main compartment and its outer similarly shaped wall merges into the wall of the main compartment. Because of the peculiar formation of the walls of the secondary compartment, they are capable of withstanding the general wear and tear of use, including knocks and the friction of the solid pieces against the diaphragm during the stirring process so that a long life thereof is assured. Furthermore by giving the diaphragm the same curvature as the rest of the vat and making their inner surfaces continuous, I avoid the formation of "dead" corners, and by constructing the secondary compartment with an outer wall merging into that of the main compartment, I avoid all pressures and strains in the wall of the vat, due to changes in temperature. The outer wall of each of the vats is indicated in the drawings by the reference character $h$ and the diaphragm by the character $i$.

In carrying out the process of my invention, the ore to be treated, which may contain silver and lead or silver, lead and zinc in the form of a sulfid, is introduced into the vat $a$ in a finely pulverized state and molten zinc chlorid is run in through the conduit $k$. Instead of zinc chlorid merely it is generally preferable to use a mixture of zinc chlorid and alkali chlorid, which mixture may take the form of a double salt of zinc chlorid and potassium chlorid or of zinc chlorid and sodium chlorid. The agitator $e$ is now operated and well known chemical reactions take place between the ore and the molten mass such that a part of the latter is transformed into silver and lead chlorids and zinc sulfid is set free, this newly formed product being added to whatever zinc sulfid may have been in the original ore. Lead is now introduced into the vat $a$ and it becomes melted and in part transformed into lead chlorid by reaction with the silver chlorid in the molten mass. The lead chlorid formed becomes dissolved in the molten mass and the corresponding amount of silver set free is dissolved in the molten lead. The main part of the silver, as well as the gold (which reacts similarly) is thus taken out of the molten mass in the vat $a$. The molten mass, together with the solid particles held in suspension therein, now flows into the vat $b$ and a small amount of zinc is introduced thereinto. Chemical reactions now take place between the zinc, the small amount of silver chlorid which is still in the molten mass and a part of the lead chlorid therein such that the whole of the silver remaining in the mass and a part of the lead depending upon the amount of zinc added, are reduced out of the molten mass and the corresponding amount of zinc is dissolved in the molten mass in the form of zinc chlorid. The lead containing a small amount of silver, thus obtained, may be introduced into the vat $a$ for the purpose of separating out silver in the manner hereinbefore described. Finally the molten mass of the vat $b$ together with the solid particles suspended therein, flows into the vat $c$ into which is added an amount of zinc sufficient to reduce the entire amount of lead, with the formation also of a corresponding amount of zinc chlorid. The molten mass is now completely free from silver and lead and consists of zinc chlorid, or in some cases of a double salt of zinc and alkali chlorids, together with the gangue and a large amount of zinc sulfid in suspended form. This mass is conducted into the transportable vessel $d$ and may be subjected to a treatment, such as dissolving in water, then filtering to remove the gangue and the zinc sulfid, then evaporating and then melting the remaining zinc chlorid whereby zinc chlorid in condition for introduction through the conduit $k$ into the vat $a$ may be prepared from the molten mass of the vat $c$. As the result of such a process as has been described, only a small amount of lead rich in silver is obtained from the vat $a$ while the larger amount of lead, free from silver, is obtained from the vat $c$. It will be readily seen that the cost of extracting the silver from the lead in this case is much less than when the old processes hereinbefore mentioned have been followed.

It is obvious that the process may be carried out in such a manner that lead of a quality suitable for cupellation is obtained from vat $a$, and lead suitable for zinc-desilverization from vat $c$.

Instead of employing three vats for carrying out the process, it is clear that two only may be employed, although in the latter case the concentration of the silver cannot be carried out so thoroughly. In this case lead rich in silver would be obtained from the first vat by means of zinc, and lead containing a small percentage of silver or lead containing no silver at all would be obtained from the second vat. It is also clearly possible to employ four or more vats instead of three, the advisability of such increase depending principally upon the character of the ore. When three or more vats are employed, the reduction of the silver by means of zinc may be made to take place in the first vat.

Since the molten mass is always discharged through the overflow ducts or pipes $f$ and the metal through the discharge holes $g$ in the bottoms of the vats, as described above, it is impossible for particles of metal to be carried over from one vat to the other and the separation of the metal from the molten mass is always much more complete than in the intermittent process, hereinbefore referred to, in which the metal and the molten mass are poured out of the same discharge pipe the one after the other.

I claim:

1. The process of treating ore containing silver which consists in first treating said ore with zinc chlorid, then extracting the silver by means of a metal having a greater affinity for chlorin than silver has, and then extracting lead by means of a metal having a greater affinity for chlorin than lead has, the several stages of the process being carried out in such a manner that the mixture of molten salts and ore resulting from the silver extracting stage of the process are caused to flow together in the same direction so as to be present all together during the lead extracting stage of the process.

2. The process of treating ore containing silver which consists in first treating said ore with a metal chlorid extracting a relatively large proportion of silver by means of lead and then extracting the remaining silver and finally the lead by successive additions of zinc, the several stages of the process being carried out in such a manner that the mixture of molten salts and ore resulting from any one stage of the process are caused to flow together in the same direction so as to be present all together during the next succeeding stage of the process.

3. The process of treating an ore containing silver which consists in first treating said ore with zinc chlorid, then extracting the silver by means of a limited quantity of a metal having a greater affinity for chlorin than silver has, in proportions approximating that required to satisfy the chlorin combined with the silver, and then extracting the lead by means of a metal having a greater affinity for chlorin than lead has, substantially as and for the purpose described.

4. The process of treating an ore containing silver and lead, which consists in first treating said ore with zinc chlorid, then extracting the major portion of the silver by means of a small amount of lead, then extracting the remaining silver by means of a small amount of zinc and finally extracting the entire amount of lead by means of a suitable amount of zinc.

5. The process of treating an ore containing silver, which consists in first treating said ore with zinc chlorid, then extracting the major part of the silver from the molten mass by means of a limited quantity of a metal having a greater affinity for chlorin than silver has, in proportions approximating that required to satisfy the chlorin combined with the silver, then extracting the remaining silver and a small part of the lead by the addition of a small amount of zinc, and finally extracting the major portion of the lead by the addition of zinc in sufficient amount to reduce the entire lead content of the molten mass.

6. The process of treating an ore containing silver, which consists in first treating said ore with zinc chlorid, then extracting the major part of the silver from the molten mass by means of a limited quantity of a metal having a greater affinity for chlorin than silver has, in proportions approximating that required to satisfy the chlorin combined with the silver, then extracting the remaining silver and a small part of the lead by the addition of a small amount of zinc and employing the silver and lead, thus obtained, in a subsequent treatment of ore as the means employed for the first extraction of silver.

7. The process of treating an ore containing silver and lead, which consists in first treating said ore with zinc chlorid, then extracting the major portion of the silver from the mass thus produced, in the form of an alloy of silver and lead by means of a small amount of lead then extracting the remaining silver in the form of a silver lead alloy by means of a small amount of zinc, then extracting the lead by means of a sufficient amount of zinc and utilizing the second silver-lead alloy above mentioned in the extraction of the major portion of silver in a subsequent treatment of ore similar to that above described.

8. The process of treating an ore containing silver and lead, which consists in first treating said ore with zinc chlorid, then extracting the silver, in two successive steps, the first by means of a small amount of lead including that of the silver-lead alloy resulting from the second silver extraction step of a prior treatment of ore, and resulting in the removal of the major portion of the silver in the form of an alloy with a small amount of lead, and the second by means of a small amount of zinc and resulting in the removal of the remaining silver also in the form of an alloy with a small amount of lead, and finally extracting the lead by means of a sufficient amount of zinc.

In testimony whereof I have hereunto set my hand in the presence of two subscribing witnesses.

ERICH LANGGUTH.

Witnesses:
 LOUIS VANDORN,
 TH. THRANBEREND.